Nov. 14, 1933.                J. B. SINDERSON                    1,935,379
                        MACHINE FOR HOBBING GEAR SECTORS
                     Filed Sept. 19, 1929        2 Sheets-Sheet 1
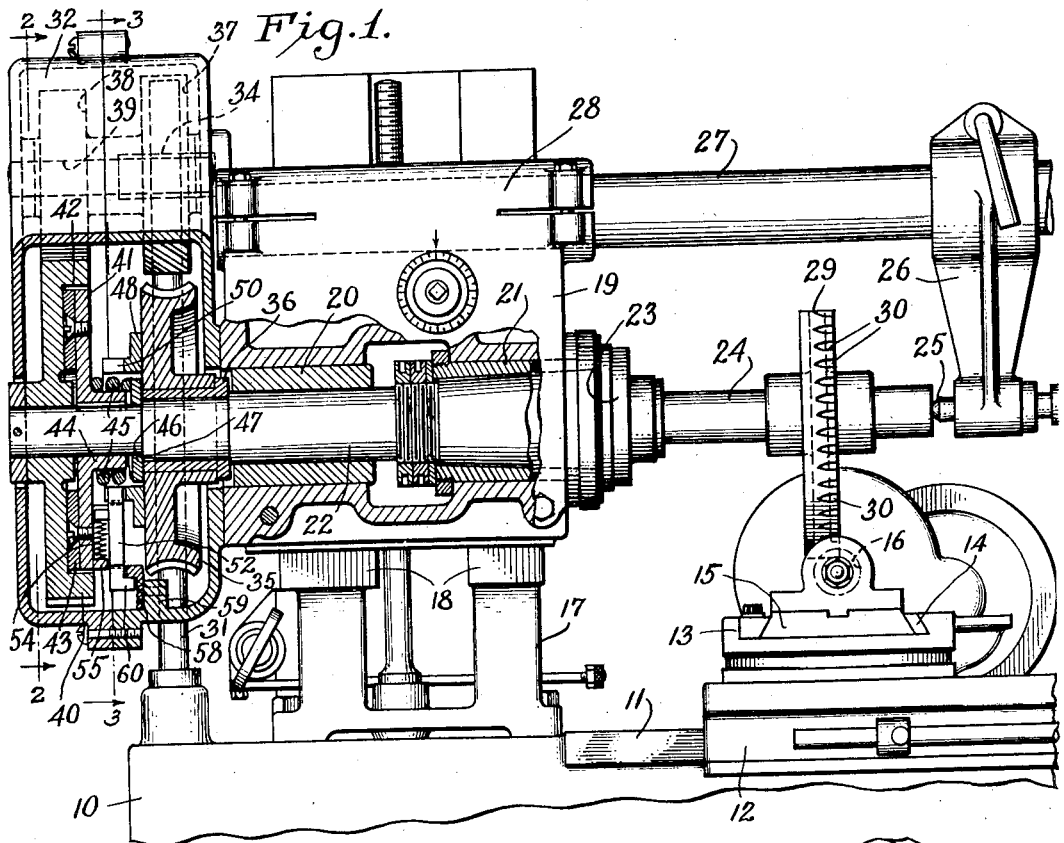
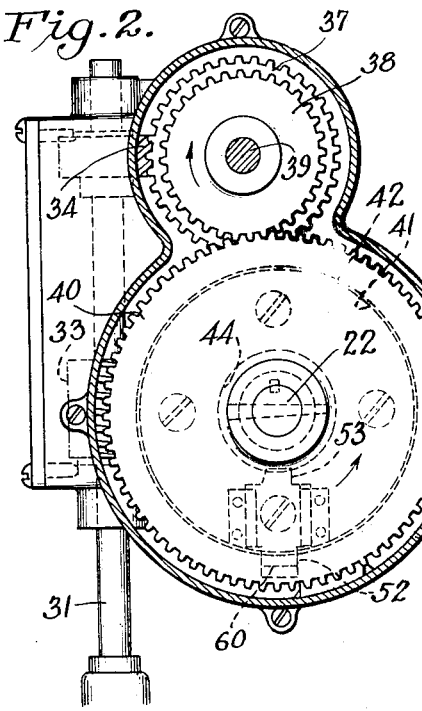
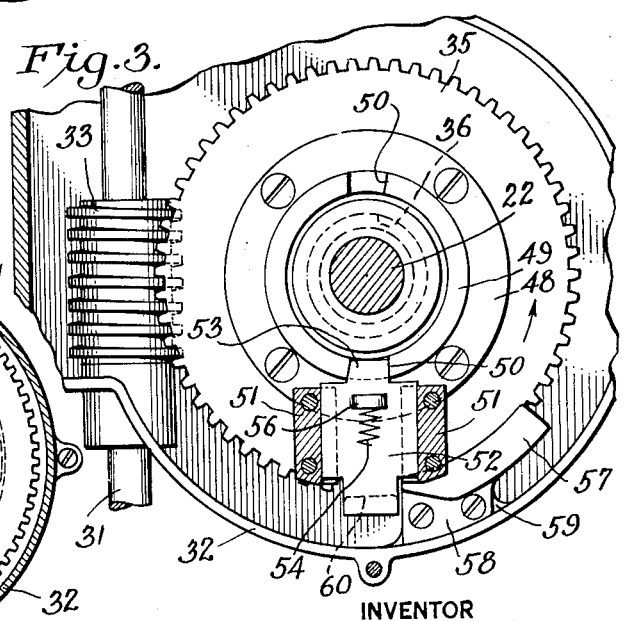
INVENTOR
John B. Sinderson
BY
ATTORNEYS Nov. 14, 1933.  J. B. SINDERSON  1,935,379
MACHINE FOR HOBBING GEAR SECTORS
Filed Sept. 19, 1929   2 Sheets-Sheet 2
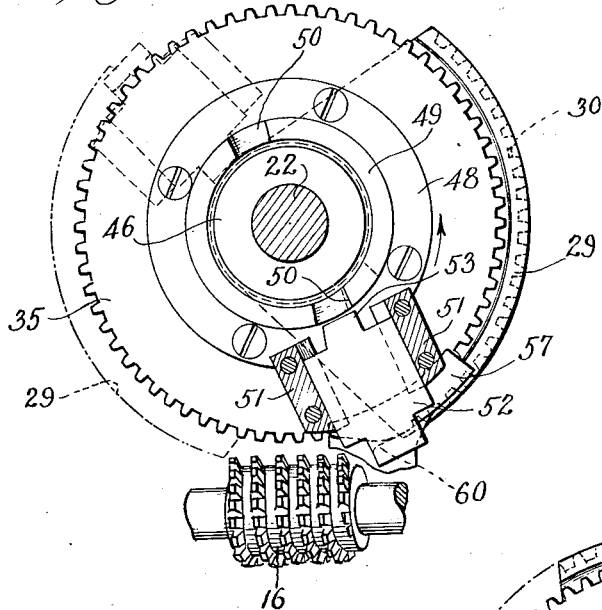
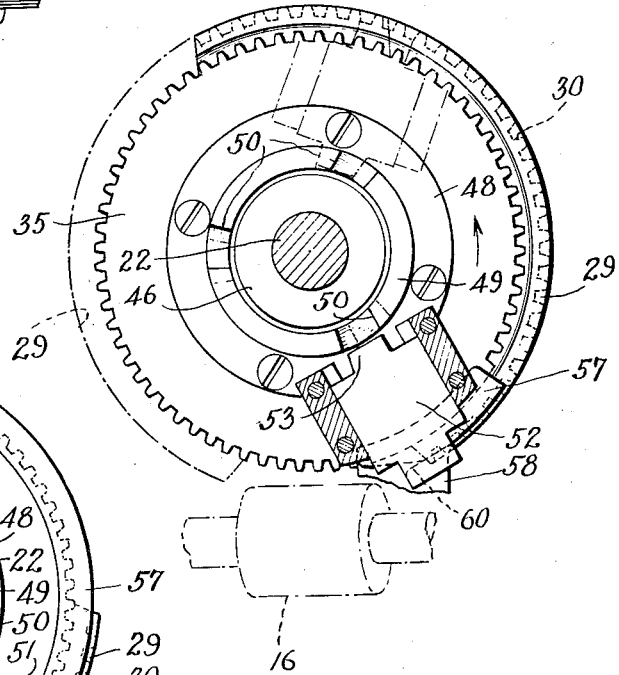
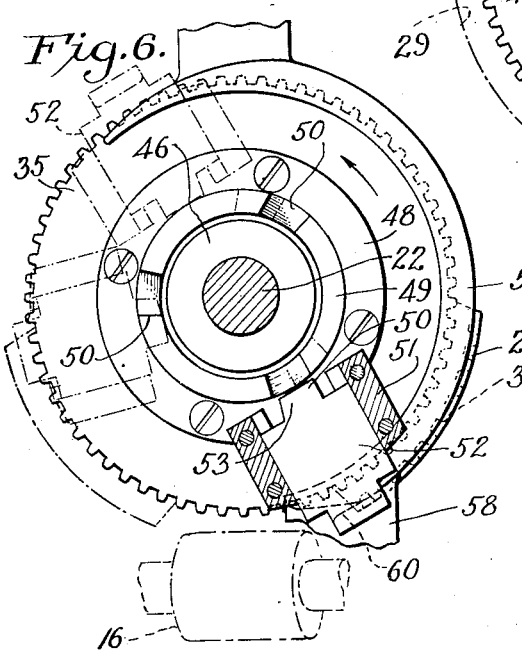
INVENTOR
John B. Sinderson
BY
ATTORNEYS Patented Nov. 14, 1933

1,935,379

UNITED STATES PATENT OFFICE 1,935,379

MACHINE FOR HOBBING GEAR SECTORS

John B. Sinderson, Rockford, Ill., assignor to Barber-Colman Company, Rockford, Ill., a corporation of Illinois Application September 19, 1929
Serial No. 393,606

9 Claims. (Cl. 90—4)

The present invention relates to improvements in means for hobbing gear teeth, and has particular reference to the hobbing of gear sectors.

Heretofore, in hobbing gear sectors, it has been customary to rotate the blank continuously at a uniform speed so as to bring the blank into cutting engagement with the hob during a portion of each revolution, and to effect a gradual axial feed of the blank relatively across the hob. Gear sectors practically always subtend less than 180°, and frequently less than 45°. Obviously, the major portion of each revolution of the gear sector hence is an idle movement, and since it is carried out at the same speed as during the actual cutting operation, results in a substantial loss of time and decrease in efficiency.

An important object of the present invention therefore resides in the provision of a novel machine for hobbing gear sectors wherein the speed of rotation of the sector when not in engagement with the hob is substantially increased so as to effect a saving in time, and hence an increase in quantity production.

A general object of this invention resides in the provision of a new and improved double-speed drive mechanism for machine tool spindles.

Another object of the invention resides in the provision of a new and improved hobbing machine for gear sectors which is compact, simple and relatively inexpensive in construction, and which is efficient, expeditious, and economical in operation.

Further objects and advantages will become apparent as the description proceeds.

In the accompanying drawings:

Figure 1 is a fragmentary front elevational view, partially in section, of a hobbing machine embodying the features of my invention.

Fig. 2 is a transverse sectional view taken along the line 2—2 of Fig. 1.

Fig. 3 is a fragmentary transverse sectional view taken along line 3—3 of Fig. 1.

Figs. 4, 5 and 6 are diagrammatic views illustrating the invention as applied to the cutting of gear sectors of approximately 120°, 180°, and 60° respectively.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The invention in its broadest aspect is adapted for various machines in which a double-speed rotative drive is desirable, but is particularly suited for and hence is disclosed as applied to the hobbing of gear sectors. Referring more particularly to the drawings, the hobbing machine constituting the exemplary embodiment of the invention comprises a base 10 having a horizontal bed 11 in which a carriage 12 is slidably mounted. A table 13 is mounted for rotary adjustment on the carriage 12, and is formed with a guideway 14 in which a slide 15 is adjustably mounted. The slide 15 operatively supports a gear-cutting hob 16 of standard construction. Suitable means (not shown) are provided for rotating the hob 16 and for feeding the carriage 12 along the bed 11.

Mounted on the base 10 at one end of the bed 11 is an upstanding column 17 having vertical ways 18 on which a headstock carriage 19 is mounted for vertical adjustment. Rotatably journaled in suitable bearings 20 and 21 in the headstock carriage 19 and extending therethrough is a horizontal work spindle 22. One end of the spindle 22 is provided with a suitable chuck 23 for supporting and driving one end of a work supporting arbor 24. The other end of the arbor 24 is seated on a center 25 mounted in a depending tailstock 26. The latter is adjustably mounted on an overhanging arm 27 secured in a clamp sleeve 28 formed on the carriage 19. Mounted on the arbor 24 is the work blank which in the present instance comprises a sector 29 to be cut on its arcuate periphery with spur gear teeth 30. It will be understood however that sectors with worm gear teeth can be cut equally well and in the same manner.

Means is provided for selectively driving the spindle 22 at two different speeds so that during engagement of the work blank 29 with the hob 16, the blank will be rotated at a slow cutting speed, and during the period of idle movement the blank will be rotated at a relatively high speed. This means comprises a main drive shaft 31 which preferably extends vertically from the base 10 wherein it is connected to a suitable source of power (not shown). The shaft 31 is suitably journaled in a gear housing 32 secured to the carriage 19, and carries a worm 33 and a spiral gear 34 in vertically spaced relation. The worm 33 meshes with a worm wheel 35 rotatably mounted on a bearing sleeve 36 on the spindle 22, and when operatively connected to the latter serves to provide a slow cutting drive. The spiral gear 34 meshes with a spiral gear 37 rigid with a spur gear 38, and rotatable on a stub shaft 39 mounted in the housing 32. Meshing with the gear 38 is a gear wheel 40 which is freely rotatable on the spindle 22, and which when operatively connected to the latter serves to provide a relative fast rotative drive.

Keyed to the spindle 22 intermediate the worm and gear wheels 35 and 40 for limited axial movement is a circular disk 41. The adjacent face of the wheel 40 is formed with an annular recess 42 adapted to receive the disk 41, and the inner face of the recess constitutes a friction clutch element adapted to coact with a companion element in the form of a flat friction ring 43 secured to the disk. A hub or sleeve 44 is formed integral with the disk 41, and a coil compression spring 45 encircles the hub and abuts at its opposite ends respectively against the disk and a slip washer 46 disposed against a shoulder 47 at the adjacent end of the bearing sleeve 36. The spring 45 tends to maintain the ring 43 in friction driving engagement with the gear wheel 40 at all times.

Rigidly secured to the inner face of the worm wheel 35 is a concentric ring or collar 48 having an annular flange 49 projecting toward the disk 41. The flange 49 is formed with a plurality of peripherally spaced notches 50, the number of notches depending on the angle subtended by the gear sector. Thus, in Figs. 3 and 4, two substantially diametrically opposed notches 50 are provided, adapting the machine to hob sectors of approximately 120°, while in Figs. 5 and 6, three equally spaced notches are provided, adapting the machine to hob sectors of 180°, 60° etc. The collar 48 therefore is subject to replacements to provide the proper number of notches for a given work blank. Slidably secured by means of guide strips 51 to the disk 41 for radial movement selectively into and out of engagement with the notches 50 is a latch member or slide 52 having a tapered latch tooth 53. A coil compression spring 54 acting at its ends respectively against an outer lug 55 on the disk 41 and an inner lug 56 on the slide 52 serves to urge the tooth 53 yieldingly into engagement with the flange 49 at all times. When the tooth 53 is in engagement with one of the notches 50, the worm wheel 35 is connected to the spindle 22 and hence drives the latter at a slow cutting speed, the wheel 40 and the disk 41 slipping relatively.

However, when the tooth 53 is retracted from the collar 48, the gear wheel 40 assumes control of the spindle 22 through its frictional engagement with the disk 41, and drives the spindle at a relatively high speed.

To retract the tooth 53 against the force of the spring 54 immediately after the work blank 29 has moved out of the contact with the hob 16, a cam 57 is secured as by means of a bracket 58 to a fixed flange 59 in the housing 32. The cam 57 is disposed in the path of a cam lug 60 on the free end of the slide 52, and its inclined lead end is positioned to be engaged by said lug just after the hob 16 has completed its cut in a given cycle. The cam 57 preferably is arcuate in character, and varies in length for hobbing sectors of different angles. In hobbing any sector, at the end of any cut, the tooth 53 is retracted from one notch 50 to institute the high speed movement, and at the start of the next cut enters another notch to institute the feed movement. Thus, but two notches figure in each cycle of movements. In certain instances, it is therefore necessary for the cam to prevent the tooth 53 from entering the wrong notch. Thus, in Figs. 3, 4 and 5, the cam 57 is merely required to retract the tooth 53, and hence is short. However, in Fig. 6, where one notch 50 must be skipped in each cycle, the cam 57 must be relatively long.

Referring to Figs. 1 to 4, a sector blank of 120° is secured in operative position. The spindle 22 then is rotated. Assuming the parts to be in the position shown in Fig. 4, the sector 29 has just moved out of engagement with the hob 16 and the tooth 53 has been retracted from the notch 50. Thereupon, the spindle 22 is rotated at a relatively high speed in the course of which movement the slide 52 moves beyond the cam 57, thereby causing the tooth 53 to ride the periphery of the flange 49. Just before the sector 29 reaches the hob 16 for the next cut, the tooth 53 overtakes the next notch 50 and snaps therein to institute the slow cutting movement. The point at which this ocurs is indicated in dotted outline, and is somewhat in advance of the position occupied by the second notch 50 in Fig. 4 due to the continuous rotation of the flange 49 during the high speed idle movement of the work. The foregoing cycle is continuously repeated, and the hob 16 is fed gradually across the work until the teeth 30 are formed.

In hobbing a sector of 180° as illustrated in Fig. 5, the operation is the same as in Fig. 4. In hobbing a sector of 60° as illustrated in Fig. 6, the cam 57 prevents a return of the tooth 53 to the surface of the flange 49 until one notch 50 has been passed, thus giving a high speed movement over an arc of approximately 240°.

It will be evident that I have provided a highly desirable means for hobbing gear sectors. By reason of the automatically increased speed during the period when the blank is not being operated on, a substantial saving in time and expense is accomplished. Worm gear teeth may be cut as well as spur gear teeth. In cutting worm gear teeth, the hob 16 is adjusted to the desired lead angle, and the blank in the course of the operation is fed vertically into the hob.

I claim as my invention:

1. In combination, a spindle, and means to continuously rotate the same in one direction comprising an impositive high speed power drive continuously connected to said spindle, a positive low speed drive for said spindle, and means automatically operable to connect said last mentioned drive to said spindle over a predetermined portion of each revolution of said spindle.

2. In combination, a spindle, and means to continuously rotate the same in one direction comprising an impositive high speed drive for said spindle, said drive being connected to said spindle at all times, a positive low speed drive for said spindle, and means automatically operable at a predetermined point in each revolution of said spindle to connect said low speed drive to said spindle and at a second predetermined point in said revolution to disconnect said low speed drive from said spindle.

3. A hobbing machine comprising, in combination, a hob, a spindle for supporting a work blank to be operated on by said hob, a main drive shaft, two trains of parallel gearing operatively connected to said shaft, each train terminating in a gear loosely mounted on said spindle, a clutch element connected to said spindle intermediate said gears, spring means for urging said element into frictional engagement with one of said gears at all times, and means automatically operable to connect said element positively to said other gear over a predetermined portion of each revolution of said spindle.

4. A hobbing machine comprising, in combination, a hob, a spindle for supporting a work blank to be operated on by said hob, a main drive shaft, two trains of parallel gearing operatively connected to said shaft, each train terminating in a gear loosely mounted on said spindle, a clutch disk keyed to said spindle intermediate said gears, spring means for urging said disk into frictional engagement with one of said gears at all times, means carried by said disk for locking said disk to the other of said gears, means tending to urge said locking means into locking position at all times, and means operable over a predetermined portion of each revolution of said spindle for removing said locking means from said other gear.

5. A hobbing machine comprising, in combination, a base, a carriage mounted for horizontal adjustment on said base, a rotary hob mounted on said carriage, a vertical column, a headstock carriage mounted for vertical adjustment on said column, a work spindle rotatably mounted in said headstock carriage and adapted to rotate a gear segment to bring the latter periodically into cutting engagement with said hob, a vertical drive shaft, a pair of gears rotatably mounted on said spindle and connected respectively through parallel chains of gearing to said drive shaft, a circular disk splined to said spindle intermediate said gears, said disk having a friction element positioned for engagement with the face of one of said gears, spring means urging said element and said last mentioned gear into engagement at all times, a ring secured to said other gear and having an annular flange formed with peripherally spaced notches, a detent radially slidable on said disk for selective engagement with said notches, spring means urging said detent inwardly toward said flange, a lug on the outer end of said detent, and cam means mounted in the path of said lug and adapted to retract said detent from said flange at a predetermined point in each rotation of said spindle, said cam means being arcuate and being operative to retain said detent out of engagement with said flange until said detent has passed the next notch.

6. A hobbing machine comprising, in combination, a base, a support on said base, a rotary hub mounted on said support, a vertical column, a headstock carriage mounted for vertical adjustment on said column, a work spindle rotatably mounted in said carriage and adapted to rotate a gear segment periodically into cutting engagement with said hob, a vertical drive shaft, a pair of gears rotatably mounted on said spindle and connected respectively through parallel chains of gearing to said drive shaft, a disk splined to said spindle intermediate said gears, spring means for urging said disk into frictional engagement with one of said gears at all times, a member secured to the other of said gears and having an annular flange formed with peripherally spaced notches, a detent radially slidable on said disk for selective engagement with said notches, spring means for urging said detent inwardly against said flange, and cam means mounted in the path of said detent and adapted to retract said detent from said flange at a predetermined point in each rotation of said spindle.

7. A hobbing machine comprising, in combination, a rotary hob, a work spindle adapted to rotate a gear segment periodically into cutting engagement with said hob, a drive shaft, a pair of gears rotatably mounted on said spindle and connected respectively through parallel chains of gearing to said drive shaft, a circular disk splined to said spindle intermediate said gears, said disk having a friction element positioned for engagement with the face of one of said gears, spring means for urging said element and said last mentioned gear into engagement at all times, a member secured to said other gear and having an annular concentric flange formed with peripherally spaced notches, a detent radially slidable on said disk for selective engagement with said notches, spring means for urging said detent inwardly toward said flange, and cam means in the path of said detent for retracting said detent from said flange at a predetermined point in each rotation of said spindle.

8. A hobbing machine comprising, in combination, a hob, a rotary spindle adapted to support a gear sector blank in position to be operated on by said hob, means for feeding said hob axially of said spindle, means for feeding said spindle laterally toward and from the plane of said hob, means for rotating said spindle at a relatively low speed, means for rotating said spindle at a relatively high speed, and automatic means for selectively rendering said low-speed and high-speed means effective when the blank is respectively in and out of cutting engagement with said hob, said low-speed means and said high-speed together rotating said spindle continuously in one direction.

9. A hobbing machine comprising, in combination, a hob, a rotary spindle adapted to support a gear sector blank in position to be operated on by said hob, means for relatively feeding said hob axially of said spindle, means for relatively feeding said spindle laterally toward and from the plane of said hob, a positive drive means for rotating said spindle at a relatively low speed, and impositive drive means continuously connected to said spindle for rotating said spindle at a relatively high speed when said positive drive means is ineffective, and automatic means for selectively rendering said slow speed and high speed drive means effective when the blank is respectively in and out of cutting engagement with said hob, said low speed drive means and said high speed drive means together rotating said spindle continuously in one direction.

JOHN B. SINDERSON.